US005161013A

United States Patent [19]

[11] Patent Number: 5,161,013

[45] Date of Patent: Nov. 3, 1992

Rylander et al.

[54] DATA PROJECTION SYSTEM WITH COMPENSATION FOR NONPLANAR SCREEN

[75] Inventors: Karen S. Rylander; Karl M. Fant, both of Minneapolis; Werner H. Egli, Maple Grove, all of Minn.

[73] Assignee: Honeywell Inc., Minneapolis, Minn.

[21] Appl. No.: 681,914

[22] Filed: Apr. 8, 1991

[51] Int. Cl.[5] .......................... H04N 5/74; H04N 7/00

[52] U.S. Cl. .................................... 358/160; 358/231; 1395/125

[58] Field of Search ....................... 395/125, 127, 128; 340/729; 358/160, 231

[56] References Cited

U.S. PATENT DOCUMENTS

| | | | |
|---|---|---|---|
| 4,645,459 | 2/1987 | Graf et al. | 434/43 |
| 4,862,388 | 8/1989 | Bunker | 395/127 |
| 4,985,854 | 1/1991 | Wittenburg | 395/126 X |
| 5,101,475 | 3/1992 | Kaufman et al. | 395/127 X |

*Primary Examiner*—James J. Groody
*Assistant Examiner*—Mark R. Powell
*Attorney, Agent, or Firm*—Wayne B. Easton

[57] ABSTRACT

A data projection system in which a data projector having a data display memory associated therewith projects images to a viewing screen. The system includes a curved or nonplanar viewing screen and computer software effective to provide viewing fidelity by compensating for inaccuracies of the viewing screen.

12 Claims, 7 Drawing Sheets

H = 1·0
W = 1·0
A = 1·0

H = 1·21
W = 0·93
A = 1·13

FIRST PASS VERTICAL
OBJECT LINE PROJECTION

SECOND PASS HORIZONTAL
OBJECT LINE PROJECTION

DATA PROJECTION SYSTEM WITH COMPENSATION FOR NONPLANAR SCREEN

The invention relates to a data projection system in which a data projector having a data display memory associated therewith projects images to a viewing screen.

The invention is more specifically directed to providing such a system having a curved or nonplanar viewing screen and, in particular, to providing computer software means effective to provide viewing fidelity by compensating for inaccuracies of the viewing screen.

The invention is applicable generally to data projection systems as indicated above. It is also specifically applicable to computer generated and synthesized imaging systems.

A main object of the invention is to provide a new and improved data projection system.

Other objects of the invention will become apparant from the following description of the invention, the associated drawings and the appended claims.

Figure 7A:
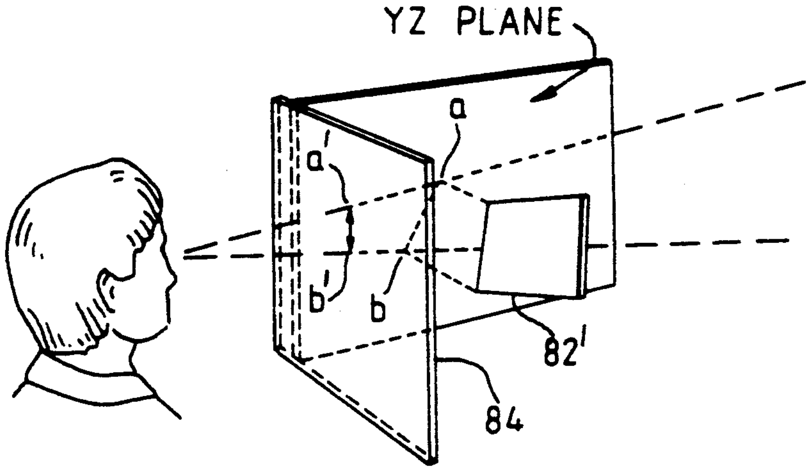
FIGS. 7A and 7B illustrate a prior art perspective, two-pass warp mapping process to which the invention is applicable.
Figure 7B:
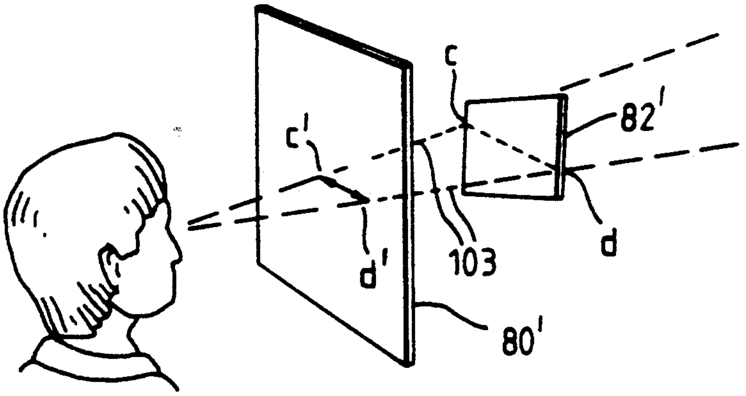
Figure 8A:
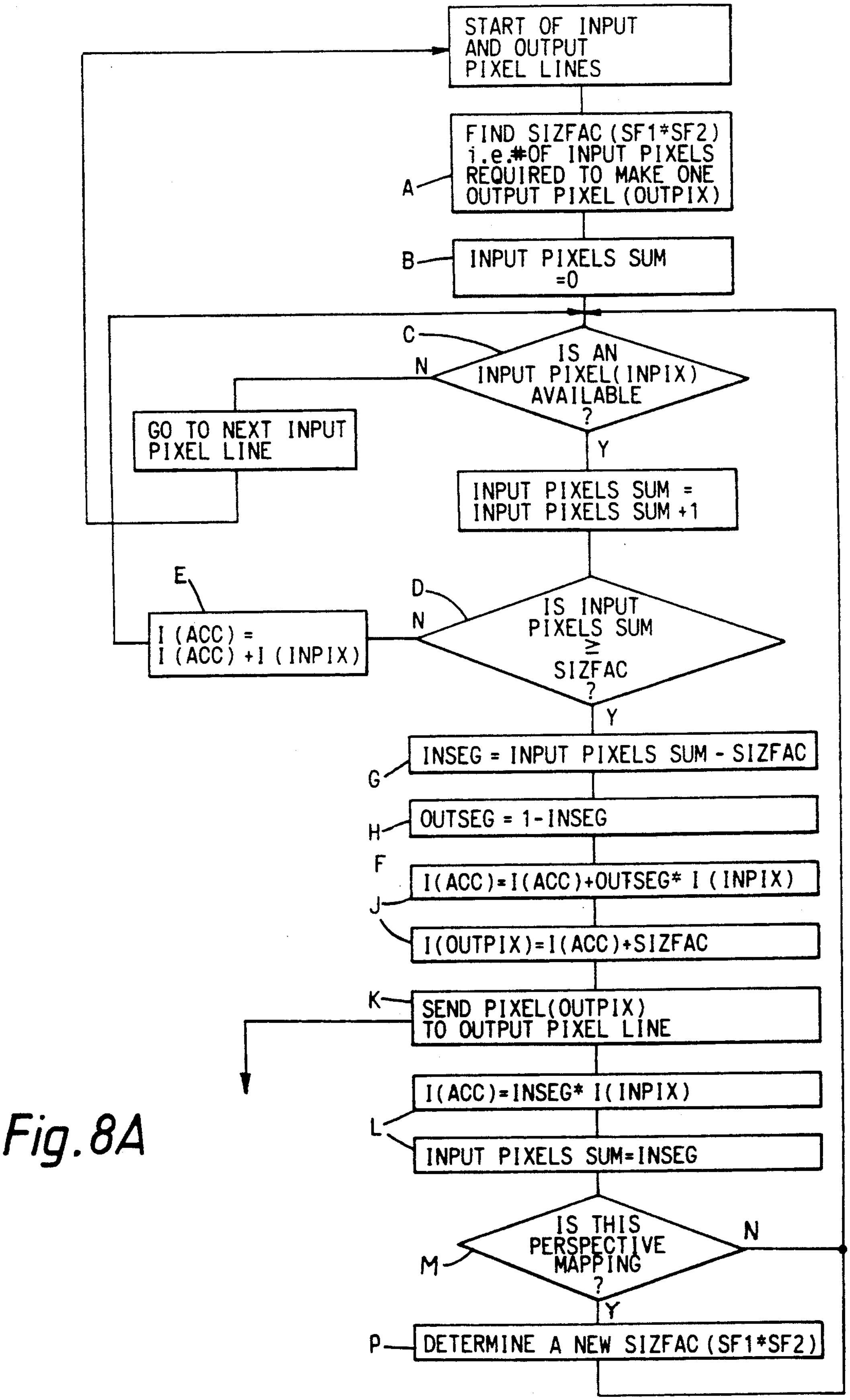
Figure 8B:
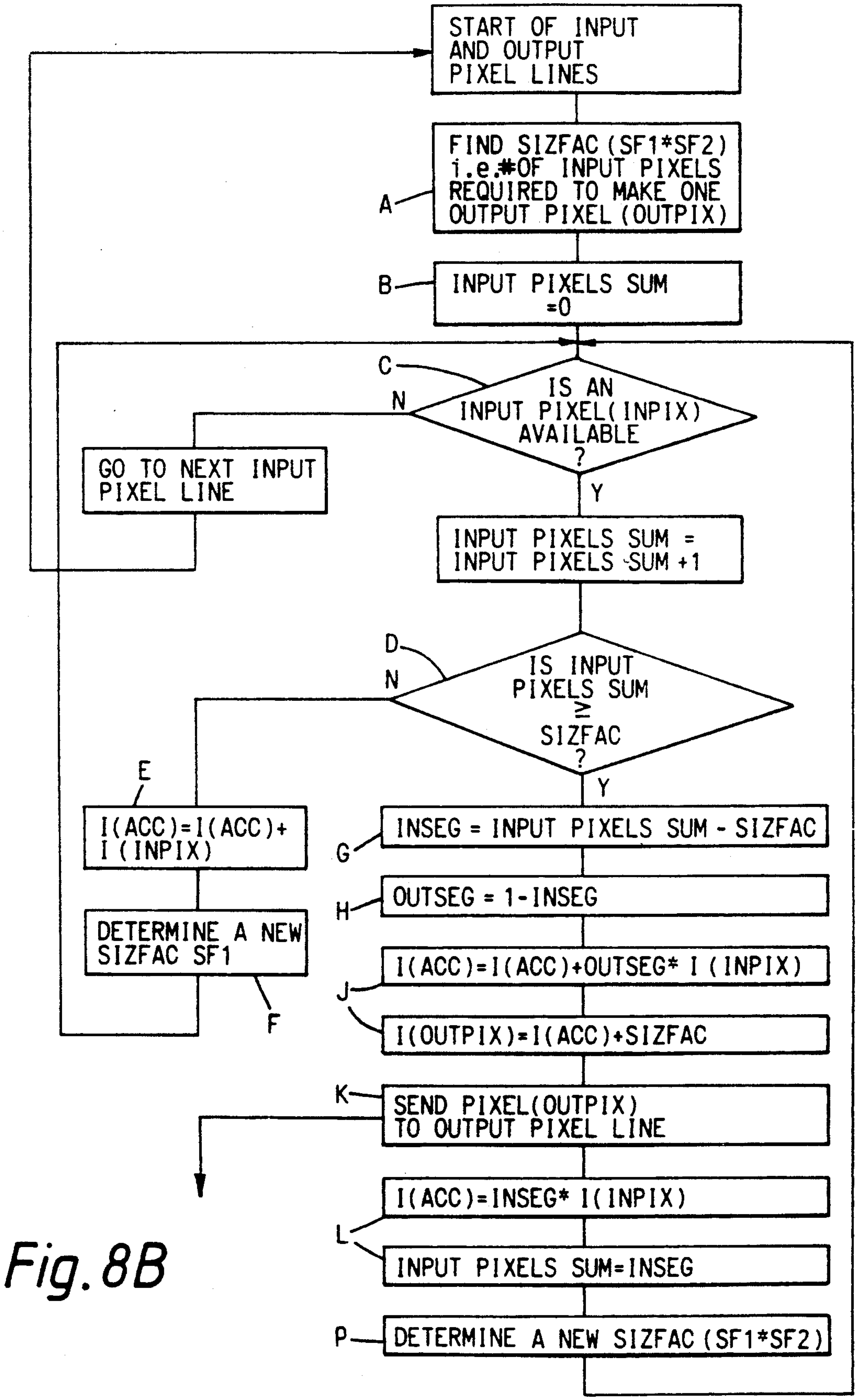

FIG. 8A is a flow chart showing the application of the invention to forms of linear and perspective mapping processes based on the disclosure of U.S. Pat. No. 4,645,459 and shown in FIGS. 6, 7A and 7B; and FIG. 8B is a flow chart showing the application of the invention to a form of a "true" perspective mapping process based on the disclosure of U.S. patent application Ser. No. 350,062, filed May 10, 1989, and illustrated in FIGS. 7A and 7B in which the SIZFAC parameter is determined with respect to each input pixel as well as with respect to each output pixel.

In a computer generated and synthesized imaging system of the type to which the invention pertains, a sequential stream of scenes is generated to produce simulated visual displays for viewing with a video output.

If the system is used for vehicle simulation such as for helicopter flight simulation, one type of displayed data would be background imagery such as for the sky and the terrain. A second type of displayed data would be object imagery such as for trees, roads and small buildings.

The background imagery may be formed by defining boundaries of terrain and sky areas and then using various techniques to cover such areas with realistic appearing surface representations. These techniques involve generating pixels of different intensities, and colors of different shades, for the areas to be covered.

Objects of the object imagery have their positions or locations defined in the data base grid system and various techniques are used to display the objects at those positions. As with background imagery, these techniques also involve generating pixels of different intensities, and colors of different shades, for portraying the objects.

Figure 1:
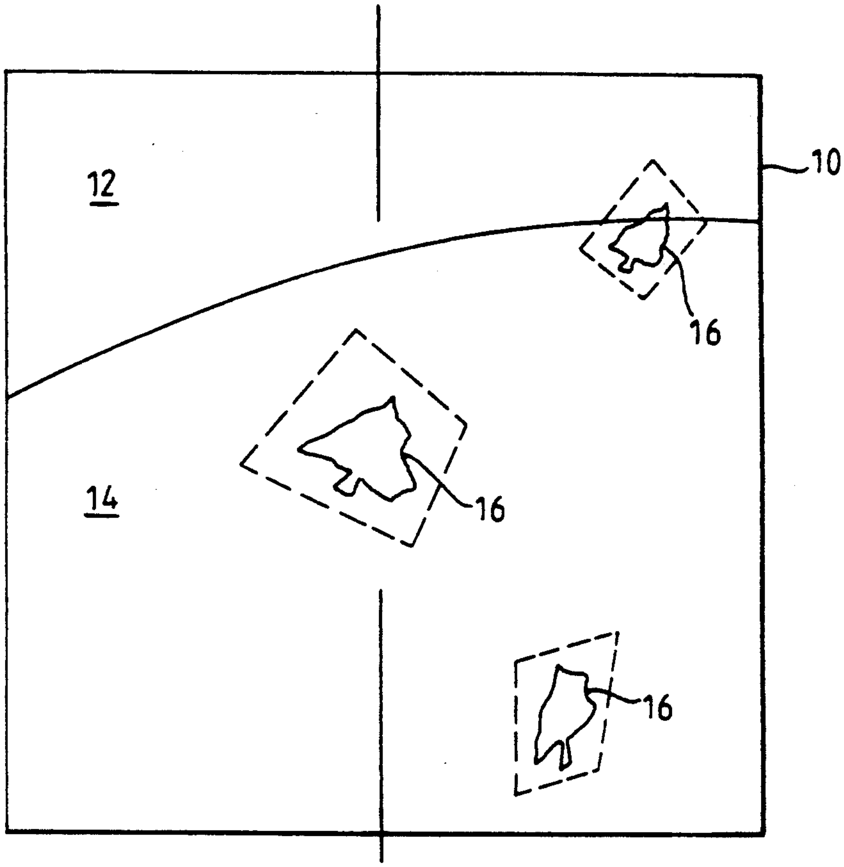
FIG. 1 shows a scene which could be generated by a computer image generator which illustrates background sky, terrain imagery and object imagery in the form of trees.

FIG. 1 shows a scene 10 which could be generated by a computer image generator and which illustrates, as referred to above, background sky and terrain imagery 12 and 14 and object imagery 16 in the form of trees. The scene 10 could be displayed with a video display monitor or, as shown in FIG. 2, on a curved screen 20 to which the scene is projected via a data projector 22.

Figure 3:
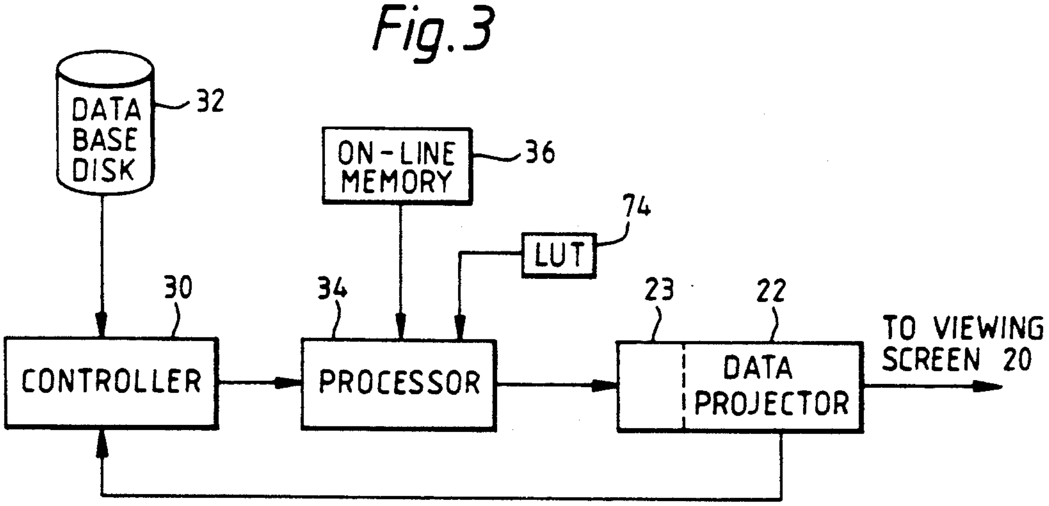
FIG. 3 shows a computer image generator system which includes a data projector.

A computer image generator system as shown in FIG. 3 could comprise a controller 30, a data base disk 32, a processor 34, on-line memory 36 and the data projector 22. Data projector 22 has display memory 23 as a part thereof for receiving display data from the processor 14.

Figure 2:
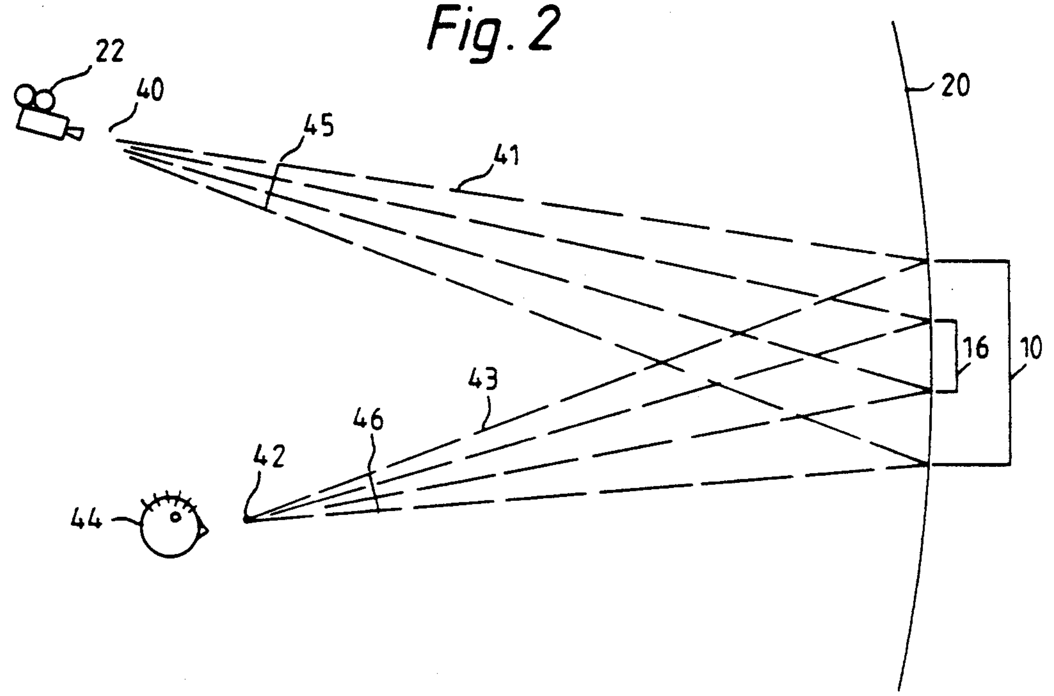
FIG. 2 shows a data projector system wherein data is projected from a projection point to a view point via a data projector and a curved reflecting or viewing screen.

Referring to FIG. 2, the data projector 22 is in a fixed or permanent position relative to the screen 20 which as a concave surface facing the projector. There is a projection point 40 for the projector 22 and a view point 42 for a viewer 44. The projector 22 must necessarily be laterally displaced relative to the viewer 44 so that the diverging projection rays 41 of the projector are not blocked by the viewer.

The beams or rays 41 projected by the projector 22 are projected in the form of pixelized images through a virtual output screen 45 and are reflected as converging rays 43 via the curved screen 20 through a virtual view screen 46 to the view point 42. The "virtual" screens 45 and 46 do not have physical existences but do serve as construction and reference models. The output screen 45 in effect comprises a rectangular array of output pixels and the view screen 46 in effect comprises a corresponding rectangular array of view pixels.

The virtual output screen 45 in effect has a pixel grid which corresponds to the resolution in the data projector display memory 23.

Screens 45 and 46 may arbitrarily have different sizes relative to each other from the conceptual and computational standpoints but are illustrated as being equal in size as a matter of convenience. With regard to the matter of size it may be noted from FIG. 2 that the sizes depend arbitrarily on the positions of the screens 45 and 46 relative respectively to the projection point 40 and the view point 42.

It is assumed for disclosure purposes that the projector 22 projects an image having a 512×512 pixel array and accordingly the screens 45, 20 and 46 will likewise have 512×512 pixel arrays. At this point in the description it may be simply assumed that the data projector 22 projects pixelized images as taught by the prior art but the actual composing of scenes represented by the images, which is an important aspect of the invention, is not discussed until further on herein.

Although it is assumed that the screens 45 and 46 are the same overall size relative to their heights, widths and areas, the curvature of screen 20 causes the heights, widths and areas of corresponding pixels in the screen 46 to be larger, smaller or equal to the corresponding dimensions of corresponding pixels in the screen 45.

Figure 4A:
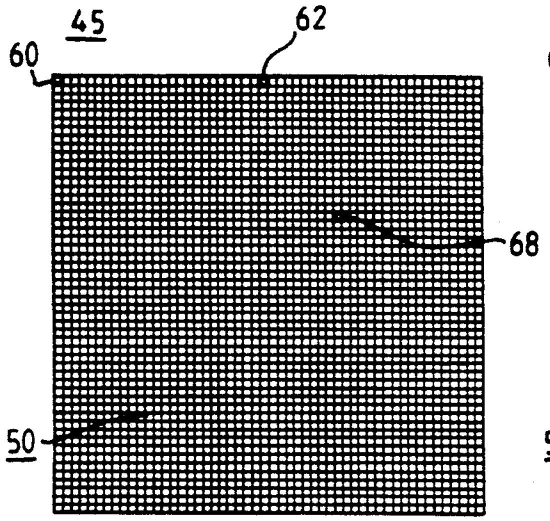
FIG. 4 shows the mapping relationship between the virtual data output or projection screen and the virtual view screen of the data projection system shown in FIG. 2.
Figure 4B:
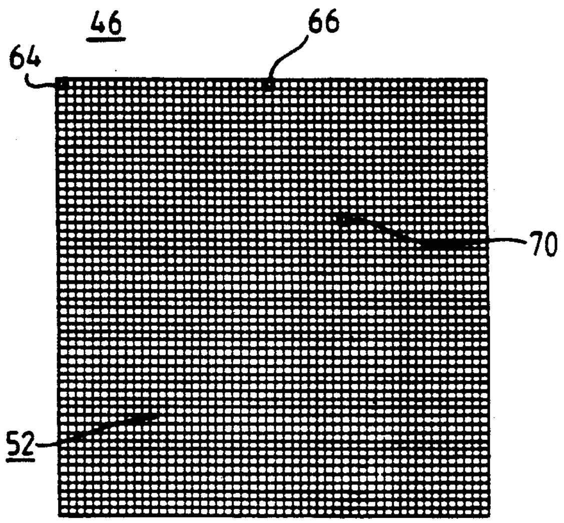

FIG. 4 shows the mapping relationship between the planar virtual data projection screen 45 and the planar virtual view screen 46. Screen 45 is illustrated as having a square pixel array, which may be 512×512 pixels, but this is optional. The array of pixels 50 of screen 45 are mapped to an array of an equal number of pixels 52 in screen 46 by being reflected thereto via the curved surface of screen 20. As the virtual screens 45 and 46 and the screen 20 are in fixed relation to each other, it is the curvature of the screen 20 that determines the individual shapes and sizes of the pixels mapped to the screen 46 from screen 45.

Each of the pixels of screen 46 is illustrated as having a square shape by reason of the symmetry of the curved screen 20 but some or even all of such pixels could have oblong shapes if so dictated by the shape of the screen 20.

The sizes and shapes of the pixels 52 of screen 46 thus depend on the curvature of the screen 20 and can be determined either experimentally or by geometry. In theory each of the pixels 52 of screen 46 represents the reflected area of the corresponding one of the pixels 50 of the screen 45.

Referring specifically to individual pixels 64 and 66 of screen 46, in this illustrated example they may by reason of the distorting effects of screen 20 be respectively larger, the same size or smaller than the corresponding pixels 60 and 62 of screen 45. In this respect it is the area of each pixel of screen 46 relative to the area of the corresponding pixel of screen 45 that is specifically relevant to the broadest aspects of the invention which only involves a one-pass mode of operation and a specific form of the two-pass mode of operation. On the other hand, it is the height and width of the corresponding pixel of screen 45 that are specifically relevant to the aspect of the invention which involves the two-pass mode of operation.

Figure 5A:
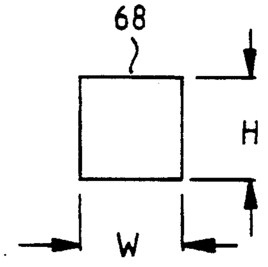
FIG. 5 is a comparison of corresponding pixels of the projection and view screens of FIG. 4 relative to the ratios of heights, widths and areas of corresponding pixels of these screens.
Figure 5B:
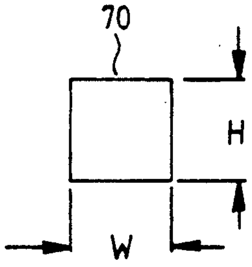

By way of illustration there is shown in FIG. 5 a comparison of corresponding pixels 68 and 70 relative to a more or less arbitrarily chosen location (330,180) of the screen 45. The pixels 68 and 70 may be referred to as source and object pixels, respectively.

Each pixel in the screens 45 and 46 has a height H and a width W. The H and W values of all the projector output pixels of screen 45 are equal to each other and may arbitrarily be assigned nominal values of 1.0. In the system shown in FIG. 2 the actual height and width of each corresponding pixel on the screen 46, such as the pixel 70, will be determined off-line by precise measurements or geometry and each height and width will be given an index value based on the nominal average values of 1.0 for the pixels of screen 45. The height and width of each object pixel in the screen 46 is thus determined relative to the 1.0 dimension of the source pixels of screen 45 such that the height and width of the object pixel 70 might be respectively determined to be 1.21 and 0.93, for example.

In the example of FIG. 5 the respective areas of the pixels 70 and 68 are 1.13 and 1.0 respectively and it follows that the ratio of the two areas is 1.13. The area ratios, which are relevant to the one-pass mode of operation and a specific form of the two-pass mode of operation are stored as 262,144 values in the look-up-table 74 shown in FIG. 3.

The invention will first be explained in connection with the two-pass mode and further on in connection with the one-pass mode.

Two-Pass Mode

For each pair of source and object pixels of screens 45 and 46 it is the ratio of the height H of the object pixel to the height H of the source pixel, and the ratio of the width W of the object pixel to the width W of the source pixel, that are relevant to the two-pass mode of operation.

The ratios of the height and width measurements are placed in a reference table which may be in the form of a look-up-table 74 (LUT 74) seen in FIG. 3. This would be 524,288 entries for the 262,144 height ratios and the 262,144 width ratios. In the above example for the location (150,220) the height ratio between pixels 70 and 68 would be 1.21/1.0 or 1.21 and the width ratio would be 0.93/1.0 or 0.93.

The reason for determining both height and width ratios has to do with the mechanics of the image generation by the processor 34 which in the two-pass mode involves two-pass vertical and horizontal scanning operations as will be referred to further on herein. The height ratios are used in connection with the vertical passes and the width ratios are used in connection with the horizontal passes.

A discussion further on herein has reference to the weights or intensities of the pixels. For a monochrome system the pixel intensities have to do with the pixel gray levels. A color system also involves intensities of the pixels as well as additional controls for the red, green and blue aspects of the color. A used herein the term "intensity" is thus intended to apply to both monochrome and color type computer image generating systems.

In operation the data projector 22 outputs scene images which are reflected by the screen 20 to the view point 42. The image is distorted relative to output screen 45 by the curved screen 20 prior to passing through the virtual view screen 46. The part of the system shown in FIG. 2, which is not novel per se, cannot itself compensate for the distortion caused by the reflecting surface of the screen 20. In the invention herein a form of distortion compensation means is provided which is a software program that can be stored in the memory 36 and run by the processor 34.

The operation of the controls of a simulated vehicle such as a helicopter through a predetermined terrain area is responsive to what is seen through the windshield (screen 46) of the vehicle by the operator. The view through the windshield or screen 46 is determined by prior art field-of-view (FOV) calculations.

The view through the windshield of screen 46 is, as indicated above, a scene composed from two very different types of data which relate to (1) a general background of terrain and sky data and (2) specific terrain objects such as trees and large rocks. Referring to item (2), there are at least three different forms of a prior art two-pass algorithm used for implementing the placement of an object into a scene. Each such form operates to map any rectangular image of the object into any convex quadrilateral as indicated in FIG. 1 by mapping the four corners of a rectangular input image into the four corners of the output quadrilateral and applying continuous line-by-line mapping from the input image to the output image to fill in the quadrilateral. This is accomplished with two passes wherein a vertical column oriented pass maps the input image to an intermediate image and a horizontal row oriented pass maps the intermediate image to the output image.

These three forms of the algorithm are independent of the equations which calculate the four output corners and are computational invariant for all transforms of arbitrary complexity once the four corners are established. Each form of the algorithm operates on column and row oriented streams of consecutive pixel values.

U.S. Pat. No. 4,645,459 discloses a linear form of the algorithm in connection with FIG. 30 thereof and a perspective form of the algorithm in connection with FIGS. 42 to 44, 47 and 48 thereof.

An improved perspective form of the algorithm is disclosed in patent application Ser. No. 350,062 titled "True Perspective Two Pass Pixel Mapping" filed May 10, 1989.

The scene 10 of FIG. 1 herein corresponds generally to the scene on the video screen 26 of FIG. 30 of the U.S. Pat. No. 4,645,459 and the scene portrayed thereon may be composed in accordance with prior art teachings.

The specific mapping algorithms disclosed in U.S. Pat. No. 4,645,459 and patent application Ser. No. 350,062 will be referred to herein only to the extent necessary to adequately describe the improvement in the invention herein and thus will not be described in detail.

Prior art algorithms are operable to periodically calculate the pixel values or intensities for every pixel of the scene 10. This would be for 262,122 pixels if, for example, the scene 10 had a resolution of 512×512 pxiels. These pixel values would be stored in 262,144 locations of a display memory which would be scanned periodically by a CRT to output scenes such as the scene 10.

With reference to FIG. 2, the invention herein is mainly concerned with providing the display memory 23 of data projector 22 with display data that is "corrected" to compensate for the curvature of the reflecting surface of screen 20 to provide a "correct" scene for the virtual view screen 46.

Although in its broadest sense the invention is applicable to systems in which a scene is composed with only one pass of the display memory 23, the scene 10 of FIG. 1 requires two passes to accomodate the objects 16. In this respect, if FIG. 2 represented the vertical center line of the frame or scene 10 of FIG. 1, the object 16 would occupy the center part of the screen 20 as indicated in FIG. 2.

The application of the invention to a two-pass system involving the placement of objects as shown in FIG. 1 could be via the processor 34. The H and W ratios stored in the LUT 74 would be utilized in connection with a two-pass operation on the display data as taught herein to alter or modify the pixel stream fed to the display memory of the data projector 22.

Figure 6:
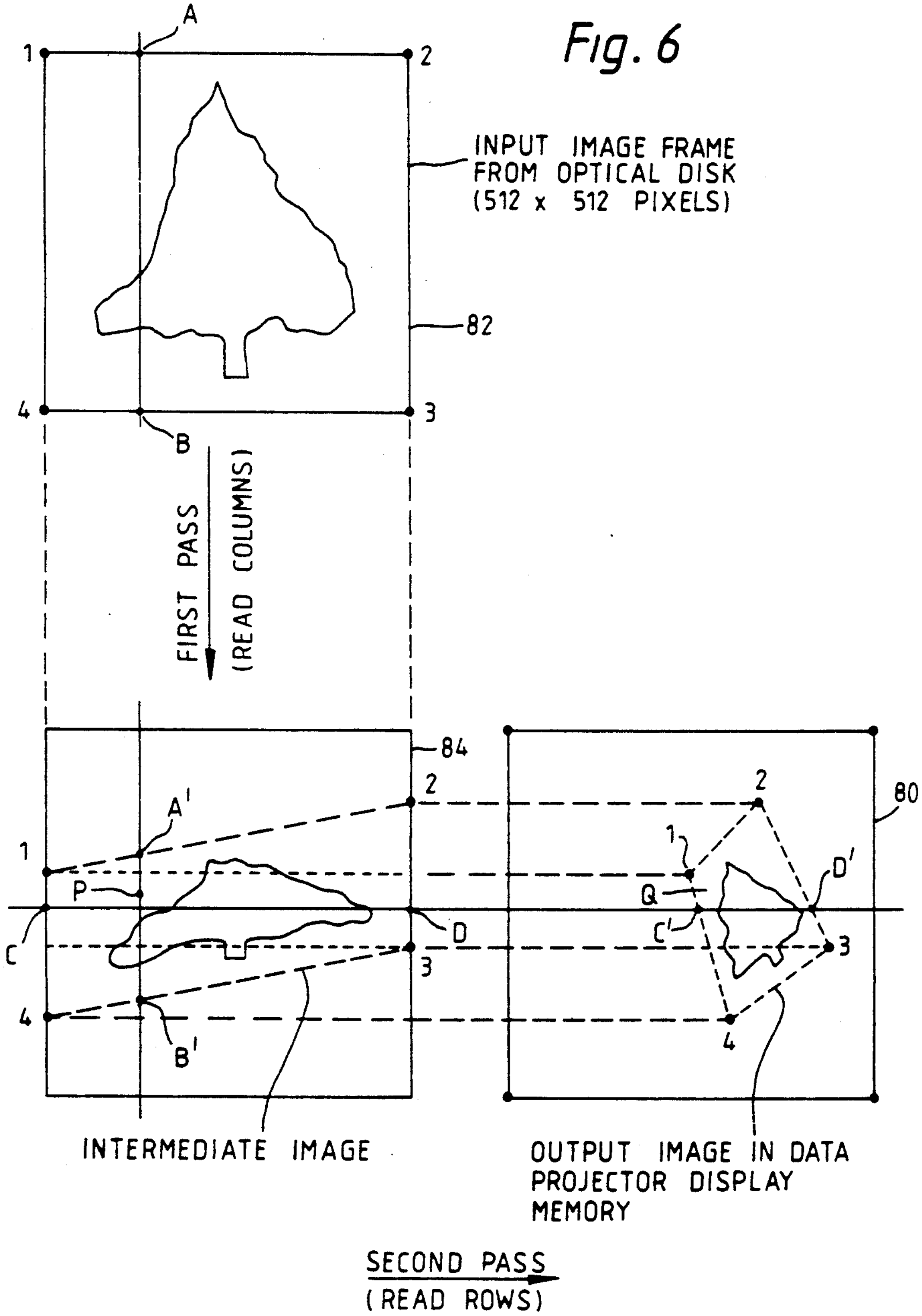
FIG. 6 illustrates a prior art two-pass, warp mapping process to which the invention is applicable.

A two-pass mapping operation is illustrated in FIG. 6 which is generally similar to FIG. 30 of U.S. Pat. No. 4,645,459 and which will be used herein to disclose how the invention is applied to linear mapping and the two forms of perspective mapping referred to above.

Referring first to FIG. 1, however, it is stated above that the displayed data for FIG. 1 involves two types of data. The first type of displayed data is the background imagery such as the sky 12 and the terrain 14. The second type of displayed data is object imagery such as trees 16.

Referring to FIG. 6, it is in accordance with prior art technology that background imagery is first applied to the output memory frame 80 and thereafter, in a two-pass operation, object imagery represented by the tree in the input memory frame 82 is mapped in a first pass to an intermediate memory frame 84 and in a second pass to the output frame 80.

In this case the tree object of the input frame 82 would have pixel intensity values but the pixels in the "background" part of the frame 82 have zero intensity values The mapping of these zero value "background" pixels to the frame 84 would thus have a null effect and therefore not have any material effect thereon.

An analogous situation is involved in the mapping of the image of the tree from frame 84 to frame 80 in that only the object (the tree) is mapped to the frame 80.

The mapping of the object imagery into frame 80 involves reading all the columns of the input frame image 82 of an object (tree) to form the intermediate image of the object in the frame 84 and the reading of all the rows of the intermediate image to form an output image of the object in the frame 80. In a sense the square input image frame 82 is mapped or "warped" to the four sided quadrilateral in the output frame 80 defined by the points 1 to 4 thereof. A program which performs this particular kind of mapping is referred to as a warper.

Although the example herein involves the mapping of all of the 512 columns and all of the 512 rows relative to the frames 80, 82 and 84, it is sufficient to explain the invention in connection with the mapping of only one column identified by the line AB in input frame 82 and the mapping of only one row identified by the line CD in frame 84. This procedure applies to the above referred to linear mapping as well as to the two forms of perspective mapping.

Referring to the linear mapping, the ratio of the line AB to the line A'B', referred to herein as SIZFAC, is the number of pixels in line AB required to form each pixel in line A'B'. If, for example, SIZFAC would equal 2.41, the average intensity of the first group of 2.41 pixels of line AB would be assigned to the first pixel of line A'B'. Likewise the average intensity of the second group of 2.41 pixels of line AB would be assigned to the second pixel in line A'B'.

Referring to the horizontal mapping, if the SIZFAC or ratio of the line CD to C'D' were 3.19, the average intensity of the first group of 3.19 pixels of line CD would be assigned to the first pixel of line C'D'. Likewise the average intensity of the second group of 3.19 pixels of line CD would be assigned to the second pixel in line C'D'.

The above described operation relative to linear mapping is in accordance with the prior art.

In the disclosure herein the height, width and area ratios of the pixels of screen 46 relative to corresponding pixels in screen 45 are each also referred to by the term SIZFAC, because pixel size comparisons are involved, but the context or basis for the comparisons are different.

In the prior mapping described above with reference to FIG. 6 the SIZFAC comparisons involve only the mapping of the quadrilateral 1 to 4 of input frame 82 to the quadrilateral 1 to 4 of intermediate frame 84 and the subsequent mapping of the latter quadrilateral to the quadrilateral 1 to 4 of output frame 80. In the pixel comparisons relative to the screens 45 and 46 of FIGS. 2 and 4, however, the SIZFAC comparisons are on a whole frame basis with there being a corresponding pixel in screen 46 for every pixel in frame 45. The two uses of the same term SIZFAC will be made clear by the use of the distinguishing terms SIZFAC 1 and SIZFAC 2 or, more conveniently, SF1and SF2. The import of this distinction will become clear as the disclosure proceeds.

Figure 1A:
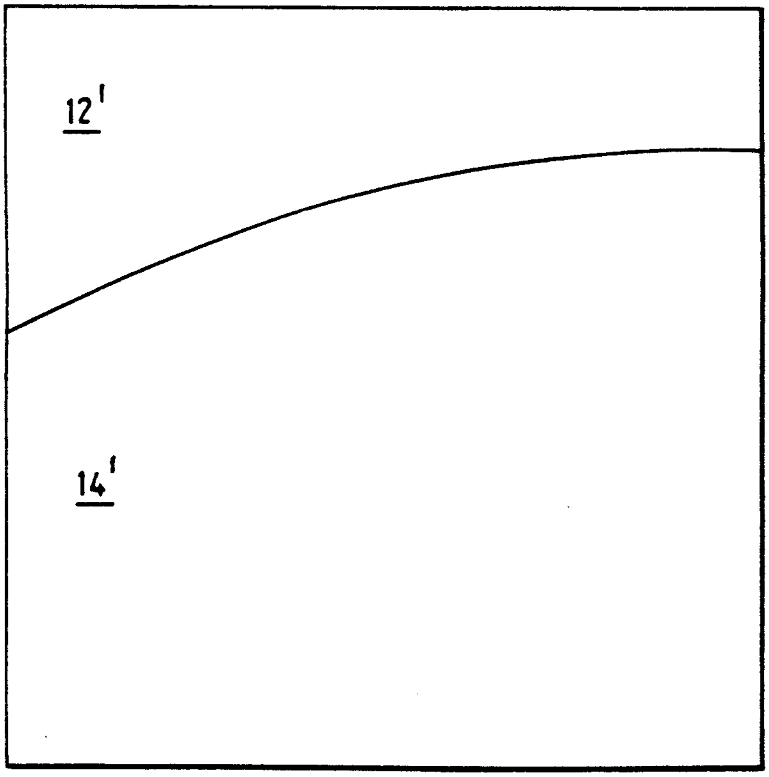
FIG. 1A is similar to FIG. 1 except that it does not have any object imagery.

With further reference to linear mapping relative to FIG. 6, it is assumed as a starting point that for the composition of each output frame 80 the display memory of the projector 22 is first provided with data representing only background imagery as illustrated in FIG. 1A which, for example, comprises sky and terrain imagery 12' and 14' but not object imagery.

Each object is to be individually mapped from an input frame 82 to the output frame 80 via the prior art two-pass algorithm as described above. In operation the representative intensity data for each object overlays or displaces the background pixel data in the output frame 80 representing the sky and the terrain.

In the invention herein the mapping in FIG. 6 from the input frame 82 to the output frame 80 involves modifying the pixel intensity values by the prior art SIZFAC value SF1 and the new SIZFAC value SF2 derived from comparisons of the pixels of screens 45 and 46.

The invention herein can thus be described generally by the equation $$I = AV \times SF1 \times SF2$$

wherein

I = Intensity value assigned to an "object" pixel mapped to either the intermediate image or the output image AV = Average intensity value of a group of "source" pixels in either the input image or the intermediate image SF1 = The size factor (SIZFAC1) representing the number of source pixels in the input or intermediate image required to form a particular object pixel in the intermediate image or output image, respectively SF2 = The size factor (SIZFAC2) representing, relative to the virtual projector and view screens (such as the screens 45 and 46 in FIGS. 2 and 4), the ratio of a dimension (such as height, width or area) of a pixel in the view screen 46 relative to a corresponding pixel in the projector screen 45.

It will be understood from the context herein that the above equation defines the broad aspects of the invention as compared to the prior art which is represented by the equation, I=AV×SF1.

In applying the equation I=AV×SF1×SF2 to the linear mapping of pixels of line AB to line A'B' to find the intensity I of the first object pixel in line A'B', the SF1 value would be 3.19 and the SF2 value would be the value of the V ratio (e.g. 1.11) at the address in LUT 74 corresponding to the "screen location" of said first pixel for line A'B'. For the resulting SIZFAC value 3.54 (i.e. 3.19×1.11) the AV of the first group of 3.54 pixels could be calculated as indicated above. This procedure thus only involves one calculation for the intensity I value of said first object pixel for said intermediate image.

The "screen location" referred to above is the location of the pixel in the quadrilateral 1 to 4 of output frame 80 which corresponds to the pixel being formed in the quadrilateral 1 to 4 of the intermediate frame 84. By way of example, the location of the pixel designated Q in frame 80 would be said "screen location" which applies to the pixel designated P in frame 84.

The pixel Q could be the pixel 68 in screen 45 of FIG. 4, for example, for which the vertical or H ratio in the LUT 74 would be 1.21 which would be the SF2 value at that point.

The above procedure for the linear mapping is repeated relative to other corresponding H ratios in the LUT 74 until each object pixel in the line A'B' of the intermediate image has a calculated intensity value I assigned thereto. Upon the completion of the intermediate image the same procedure is repeated in horizontally mapping the intermediate image to the output image relative to the lines CD and C'D' except that different SF1 values will be needed and the values of the respective W ratios in the LUT 74 are used for SF2 instead of the ratios.

A flow chart shown in FIG. 8A illustrates the above linear mapping algorithm as well as a form of perspective mapping algorithm referred to further on herein.

The flow chart of FIG. 8A is only for one pair of input and output pixel lines which can be, with reference to FIG. 6, for mapping a vertical pixel line AB from input frame 82 to line A'B' of intermediate frame 84 or for mapping a horizontal pixel line CD from the intermediate frame 84 to the line C'D' of output frame 80.

In step A the SIZFAC value is the product of SF1 and SF2 referred to above. The INPUT PIXELS SUM in step B is a register which keeps track on a fractional basis of the number of input pixels selected to form the next output pixel.

The INPIX pixel in step C is the current input pixel selected. The decision box in step D determines whether enough input pixels have been selected to form one output pixel.

In step E, I(ACC) is an accumulator value which is updated for each loop by adding thereto the intensity value I(INPIX) of the current input pixel INPIX.

In step G the fractional part of the current pixel INPIX to be included in forming the next output pixel in step H is OUTSEG. In step H the fractional part of the current pixel INPIX to be included in forming an output pixel OUTPIX in the next loop is INSEG.

Steps J are for the calculation for the intensity of the output pixel OUTPIX for step K.

Steps L take care of transferring the fractional size part (INSEG) and intensity I(ACC) of the current pixel (INPIX) to the return part of the loop for inclusion in the formation of the next output pixel OUTPIX.

Step M is the option for the perspective mapping. The linear mapping relative to FIG. 6 is continued by bypassing step M and returning to step C.

Referring to the perspective form of mapping disclosed in U.S. Pat. No. 4,645,459 and also covered by the flow chart of FIG. 8A, FIGS. 7A and 7B hereof which illustrate the perspective mapping are generally similar to FIGS. 47 and 48 of said patent. The perspective mapping illustrated in FIGS. 7A and 7B is generally analogous to the linear mapping illustrated in FIG. 6 herein except that the orientation of the object frame 82' in 3D space determines the perspective aspects of the mapping and the two-pass mapping thereof to the intermediate frame 84' and the output frame 80' is thus in accordance with the disclosure of U.S. Pat. No. 4,645,459.

The perspective mapping utilizes the same algorithm used for linear mapping relative to the determination of the quadrilaterals in the intermediate and output frames to which input and intermediate images are to be mapped or warped.

It is characteristic of the first form of the perspective mode that with reference to FIGS. 7A and 7B, each new SIZFAC (SF1) be calculated after the formation of each object pixel in vertical lines a'b' and horizontal lines c'd'. The intensity of each object pixel so formed is likewise dependent upon the SIZFAC (SF2) value which is represented by the H or W ratio at the corresponding screen location (in screen 45 of FIGS. 2 and 4) of said object pixel.

The two-pass perspective mapping procedure begins, as indicated in FIG. 8A, in the same way as the linear mapping by first finding, with reference to FIGS. 7A and 7B, a SIZFAC value SF1 at point a' of line a'b' which is the instantaneous ratio of the number of input pixels required to form one output pixel. At the same time the SIZFAC value SF2 is determined, this being the value of the H ratio (e.g. 0.89) at the address in LUT 74 corresponding to the screen location of the first object pixel for line a'b'. If the product of SF1×SF2 were 3.3, for example, the intensity values of the first and each successive pixel of line ab would be summed until a group of 3.3 pixels were processed in this manner. This sum would be divided by 3.3 (SIZFAC) to obtain the average intensity AV of the first group of 3.3 pixels of line ab which would then be assigned as the intensity value for the first pixel of line a'b'. After this first pixel is formed new SIZFAC values SFl and SF2 are determined (step P in the flow chart of FIG. 8A) for the next group of pixels of line ab to be used to form the intensity value for the second pixel of line a'b'.

This procedure involving the determination of new values of SF1 and SF2 after the completion of each pixel in line a'b' is continued until each pixel in line a'b' has a calculated intensity value I assigned thereto. Upon the completion of the intermediate image in frame 84' the same procedure is repeated in mapping the intermediate image to the output image in the frame 80' relative to the lines cd and c'd'.

The above described procedure relative to perspective mapping is, as indicated above, set forth in the flow chart of FIG. 8A via the step P which requires the determination of a new SIZFAC (SF1×SF2) after the outputting of each object pixel in the perspective mode.

In the invention herein the perspective mode of mapping in FIGS. 7A and 7B to the intermediate frame 84' and to the output frame 80' thus likewise involves modifying the pixel intensity values by the SIZFAC relationships SF2 of the screens 45 and 46. The procedure is analogous to the above described procedure relating to linear mapping in that the equation $I = AV \times SF1 \times SF2$ for the intensity values for pixels formed in the intermediate and output frames is equally applicable.

The application of the invention to the second perspective form of the two-pass algorithm disclosed in the above referred to patent application Ser. No. 350,062 is generally analogous to the above described application of the invention to the first perspective form disclosed in U.S. Pat. No. 4,645,459. The application of the invention to the second perspective form is illustrated in the flow chart of FIG. 8B.

The two-pass mapping procedure thereof begins in the same way as the above referred to linear and first form of perspective mapping systems by first finding a SIZFAC value (i.e. SFl) by determining at the start of the input and output pixel lines (step A in FIGS. 8A and 8B) with reference to FIGS. 7A and 7B the ratio of line ab to a'b' or the ratio of the line cd to c'd'.

The primary difference is that in the algorithm of Ser. No. 350,062 an SF1 SIZFAC ratio is also calculated after each input or source pixel is consumed as well as after each output or object pixel is formed. As the invention herein only involves applying the SF2 ratios of the screens 45 and 46 to output pixels on the a'b' and c'd' lines of FIGS. 7A and 7B, the SF2 factor would only be applied to step P as indicated in FIG. 8B, and thus not to step F thereof.

Modified Form of Two-Pass Mode

In the two-pass mode disclosed above each of the flow charts of FIGS. 8A and 8B represents the vertical and horizontal passes. That is, in each case the flow chart is the same for the vertical and horizontal passes. With reference to FIG. 5, the SF2 factors for the vertical passes are represented by the height ratios H and the SF2 factors for the horizontal passes are represented by the width ratios W.

A modified form of the invention may be disclosed by relevant changes in the flow charts of FIGS. 8A and 8B.

With reference to either FIG. 8A or FIG. 8B, the use of the flow chart thereof for vertical passes would be modified by omitting the SF2 factor in steps A and P. Thus only the SIZFAC SF1 would be used for the vertical passes.

The use of the flow chart (in either FIG. 8A or FIG. 8B) for horizontal passes would remain the same except that the area ratios A of FIG. 5 would be used for the SIZFAC SF2 instead of the horizontal ratios W.

The rationale of this modification is that each area ratio A is the product of the corresponding H and W ratios and thus applying the A ratios for the horizontal passes is equivalent to applying the H and W ratios respectively to the vertical and horizontal passes.

One-Pass Mode

In the broadest sense the invention is applicable to systems in which a scene is composed with background imagery which only requires one pass of the data base. FIG. 1A shows a scene 10' without any objects placed therein and thus requires only one pass for its completion. Without the application of the invention herein that one pass would result in supplying the display memory of data projector 22 with "correct" data portraying the scene 10' of FIG. 1A. This would result in an inaccurate image at the screen 46, however, because of the curvature of the surface of the reflecting screen 20.

It is the area ratios which are relevant to the one-pass mode of operation. The area ratios are stored as 262,144 values in the look-up-table 74 shown in FIG. 3.

The application of the invention to a one-pass system could also be via the processor 34 which would utilize the area ratios "A" stored in the LUT 74 in connection with a one-pass operation on the display data as taught herein to alter or modify the pixel stream fed to the display memory of the data projector 22.

With reference to the source and object pixels 68 and 70 indicated in FIGS. 4 and 5, the area of object pixel 70 is 1.13 times larger than the area of source pixel 68. The program would operate to multiply the intensity of the corresponding pixel supplied to the display memory of the projector 22 by the ratio 1.13 taken from the LUT 74. The theory is that the "correction" will cause the visual effects to be the same because the intensity of the object pixel 70 in screen 46 is increased to match its larger size relative to the size of the source pixel 68 in screen 45.

Thus with one-pass systems the "corrections" are effected with the area ratios stored in the LUT 74 which indicate the relative sizes of the object pixels with respect to the source pixels.

It is claimed:

1. A data projection system, said system comprising, computer means including a buffer memory and a display memory,
   a graphics program runnable by said computer means to generate display data for said display memory,
   projection and view points laterally spaced from each other,
   data projector means having access to said display memory and being operable to output a pixelized image from said display memory in the form of diverging rays diverging from said projection point,
   a viewing screen having a curved reflecting surface for receiving said divergent rays and reflecting them in the form of converging rays converging at said view point,
   a virtual output screen in a plane between said projection point and said reflection surface having a rectangular array of output pixels formed by said diverging rays and representing said display data,
   a virtual view screen in a plane between said view point and said reflecting surface having a rectangular array of view pixels formed by said converging rays and corresponding respectively to said output pixels,
   a reference table having size ratios representing comparisons of dimensional size parameters of said pixels of said virtual view screen relative to corresponding ones of said pixels of said virtual output screen, and
   said graphics program being adapted to utilize said size ratios listed in said reference table to condition said display data so as to compensate for inaccuracies of said virtual view screen relative to said virtual output screen due to inaccuracies of said reflecting surface.

2. A data projection system according to claim 1 wherein said graphics program being a method of mapping from a 2D input image in a 3D coordinate system to said display memory, said graphics program having a two pass mode wherein with a vertical pass vertical lines of pixels derived from said input image are mapped to said buffer memory to form an intermediate image therein, and with a horizontal pass horizontal lines of pixels of said intermediate image are mapped to said display memory to form a display image therein.

3. A data projection system according to claim 1 wherein said reflecting surface is a concave surface.

4. A data projection system according to claim 1 wherein said size ratios are for pixel height and width comparisons.

5. A data projection system according to claim 1 wherein said size ratios are for pixel area comparisons.

6. A data projection system according to claim 1 wherein said virtual output and view screens have the same height and width dimensions.

7. A data projection system of the type having projection and view points laterally spaced from each other, said system comprising,
   data projector means having a display memory associated therewith and being operable to output a pixelized image from said display memory in the form of diverging rays diverging from said projection point,
   a reflecting surface for receiving said divergent rays and reflecting them in the form of converging rays converging at said view point,
   a virtual output screen in a plane between said projection point and said reflecting surface having a rectangular array of output pixels formed by said diverging rays and representing said display memory,
   a virtual screen in a plane between said view point and said reflecting surface having a rectangular array of view pixels formed by said converging rays and corresponding respectively to said output pixels,
   a reference table having size ratios representing comparisons of dimensional size parameters of said pixels of said virtual view screen relative to corresponding ones of said pixels of said virtual output screen,
   program means for processing input data to provide said display memory with display memory data for a desired output to said view point,
   said program having means for altering said input data in accordance with said size ratios of said reference table to compensate for inaccuracies of said reflecting surface.

8. A data projection system according to claim 7 wherein said program means operate to map said input data to said display memory with a single pass.

9. A data projection system according to claim 2 wherein said size ratios are for pixel area comparisons.

10. A data projection system according to claim 7 wherein said program means operates to map said input data to a buffer memory via a vertical pass and sequentially from said buffer memory to said display memory via a horizontal pass.

11. A data projection system according to claim 10 wherein said program means operates to alter said input data only during said second pass and said size ratios are for pixel area comparisons.

12. A data projections system according to claim 10 wherein said program means operates to alter said input data during said first pass by applying said size ratios which are for pixel height comparisons and to alter said input data during said second pass by applying said size ratios which are for pixel width comparisons.

* * * * *